United States Patent [19]

Shaffer

[11] Patent Number: 5,608,984
[45] Date of Patent: Mar. 11, 1997

[54] WATERFOWL DECOY SYSTEM

[76] Inventor: Russell W. Shaffer, 29W 537 Country Ridge Dr., Apt. A, Warrenville, Ill. 60555

[21] Appl. No.: 623,138

[22] Filed: Mar. 28, 1996

[51] Int. Cl.⁶ .................................................. A01M 31/06
[52] U.S. Cl. .................................................. 43/3
[58] Field of Search .......................................... 43/1, 2, 3

[56] References Cited

U.S. PATENT DOCUMENTS

| | | | |
|---|---|---|---|
| 261,910 | 8/1882 | Cochel | 43/3 |
| 1,836,504 | 12/1931 | Prince | 43/3 |
| 2,595,966 | 5/1952 | Majors | 43/3 |
| 2,624,144 | 1/1953 | Beverman | 43/3 |
| 3,115,721 | 12/1963 | Story | 43/3 |
| 4,450,642 | 5/1984 | Dekezel et al. | 43/3 |
| 4,535,560 | 8/1985 | O'Neil | 43/3 |
| 4,566,214 | 1/1986 | McCrory et al. | 43/3 |
| 4,607,447 | 8/1986 | Wright | 43/2 |
| 4,890,408 | 1/1990 | Heiges et al. | 43/3 |
| 5,074,071 | 12/1991 | Dunne | 43/2 |
| 5,207,757 | 5/1993 | Franczshini | 43/3 |
| 5,235,774 | 8/1993 | Burgoff | 43/44.99 |

FOREIGN PATENT DOCUMENTS 2679737  2/1993  France ............................. 43/3

*Primary Examiner*—J. Elpel
*Attorney, Agent, or Firm*—Joseph N. Breaux

[57] ABSTRACT

A waterfowl decoy system including a plurality of combined feed decoy/anchor members each having an outer surface pigmented with a color that contrasts with a water bottom and having a weight-to-volume ratio sufficient to cause each of the plurality of combined feed decoy/anchor members to sink to the bottom of a body of water, each of the plurality of combined feed decoy/anchor members having connecting rings extending from opposed side walls thereof in a manner to allow two or more of the plurality of combined feed decoy/anchor members to be linked end to end with a connecting mechanism; a plurality of threaded eyebolts securable to the combined feed decoy/anchor members; a feeding duck decoy member having a tether securable to the eyebolts; and a swimming duck decoy member having a tether securable to the eyebolts.

12 Claims, 2 Drawing Sheets

5,608,984

WATERFOWL DECOY SYSTEM

TECHNICAL FIELD

The present invention relates to decoys for attracting waterfowl to a desired location and more particularly to a decoy system simulating feeding waterfowl that includes a combined food decoy/anchor mechanism positionable beneath the surface of a body of water to simulate food items located below the water surface.

BACKGROUND ART

It is often desirable when hunting, or otherwise desiring to attract waterfowl to a particular location, to set out decoys to attract attention to the desired location. Flying water fowl are attracted to the simulated activity and come closer to investigate. One of the activities most desirable to simulate is that of feeding waterfowl. It would be a benefit, therefore, to have a decoy system that appears to flying waterfowl to be feeding activity.

GENERAL SUMMARY DISCUSSION OF INVENTION

It is thus an object of the invention to provide a waterfowl decoy system that simulates waterfowl feeding activity.

It is a further object of the invention to provide a waterfowl decoy system that simulates feeding activity that also provides a visual cue to flying waterfowl of the existence of food items beneath the surface of a body of water.

It is a still further object of the invention to provide a waterfowl decoy system that provides a visual cue to flying waterfowl of the existence of food items beneath the surface of a body of water that utilizes an anchoring device as the visual cue.

Accordingly, a waterfowl decoy system is provided. The decoy system includes a plurality of combined feed decoy/ anchor members each having an outer surface pigmented with a color that contrasts with a water bottom and having a weight-to-volume ratio sufficient to cause each of the plurality of combined feed decoy/anchor members to sink to the bottom of a body of water, each of the plurality of combined feed decoy/anchor members having connecting rings extending from opposed side walls thereof in a manner to allow two or more of the plurality of combined feed decoy/anchor members to be linked one to end with a connecting mechanism, each of the plurality of combined feed decoy/anchor members having an upper surface thereof having an least one threaded eyebolt receiving aperture formed therein and a lower surface having a ballast receiving chamber member secured thereto, the ballast receiving chamber member having a sealable ballast cavity formed therein and filled with a ballast material; a plurality of threaded eyebolts threaded to engage the eyebolt apertures, each eyebolt having an eye aperture therethrough through which a flexible tether is positionable; a feeding duck decoy member having a buoyant feeding-bird shaped, first decoy portion, a first ballast portion secured beneath the first decoy portion and a first tether line securable to the eye aperture of one of the plurality of eyebolts; and a swimming duck decoy member including a buoyant, full-bird shaped, second decoy portion, a second ballast portion secured beneath the second decoy portion and second tether line securable to the eye aperture of one of the plurality of eyebolts.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
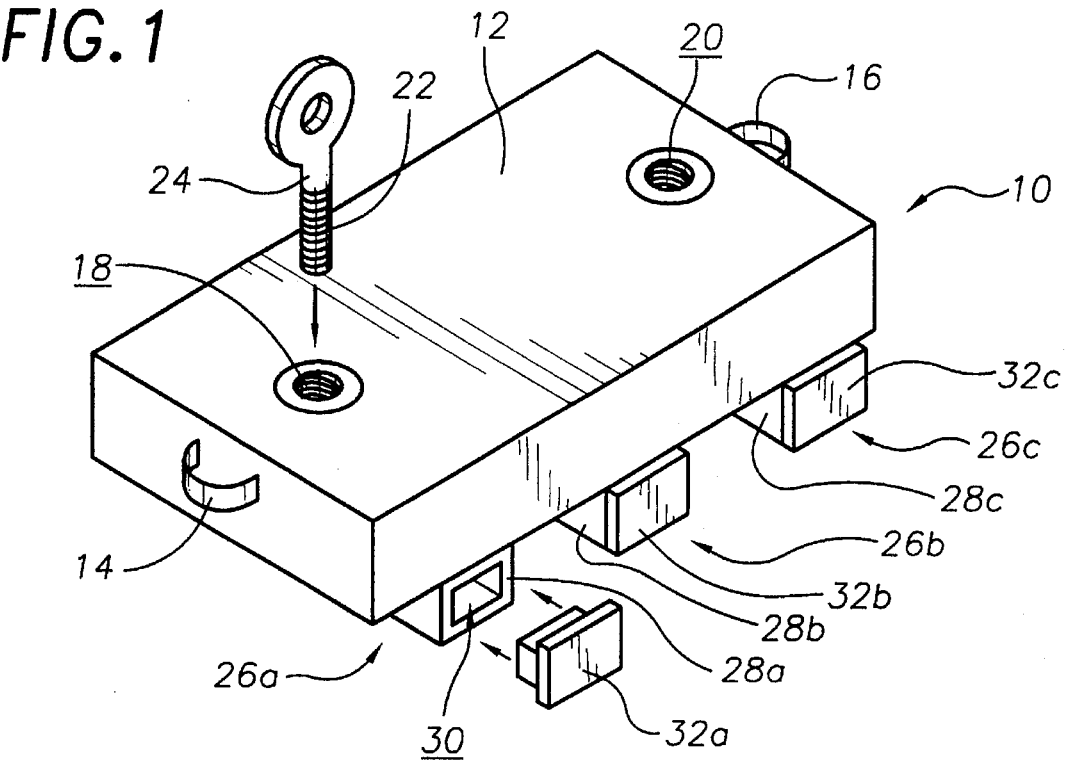
FIG. 1 is a partially exploded perspective view of an exemplary embodiment of the combined feed decoy/anchor member of the decoy system of the present invention showing the threaded eyebolt apertures, the forward and rear connection rings, and the three ballast tubes filled with metal ballast.

FIG. 1 is a partially exploded perspective view of an exemplary embodiment of the combined feed decoy/anchor member of the decoy system of the present invention generally designated by the numeral 10. Combined feed decoy/anchor member 10 is constructed from plastic having a bright yellow pigment mixed therein to provide an outer surface 12 having an appearance simulating a quantity of corn. First and second connecting rings 14,16 extend from opposed side walls of combined feed decoy/anchor member 10. A pair of threaded eyebolt receiving apertures 18,20 are provided on outer surface 12 to engage with a threaded portion 22 of an eyebolt 24.

Three ballast receiving chamber members 26a,26b,26c constructed from lengths of square cross-section plastic tubing 28a,28b,28c are secured beneath combined feed decoy/anchor member. Each length of plastic tubing 28a, 28b,28c has a ballast cavity 30 (only one shown) that is filled with copper pellets and sealable with a cap portion 32a,32b, 32c. Cap portions 32a,32b,32c are removable by the user to allow the user to add additional ballast material if desired. A sufficient quantity of copper pellets is placed within ballast cavities 30 to give combined feed decoy/anchor member a weight-to-volume ratio sufficient to cause combined feed decoy/anchor member 10 to sink to the bottom of a body of water.

Figure 2:
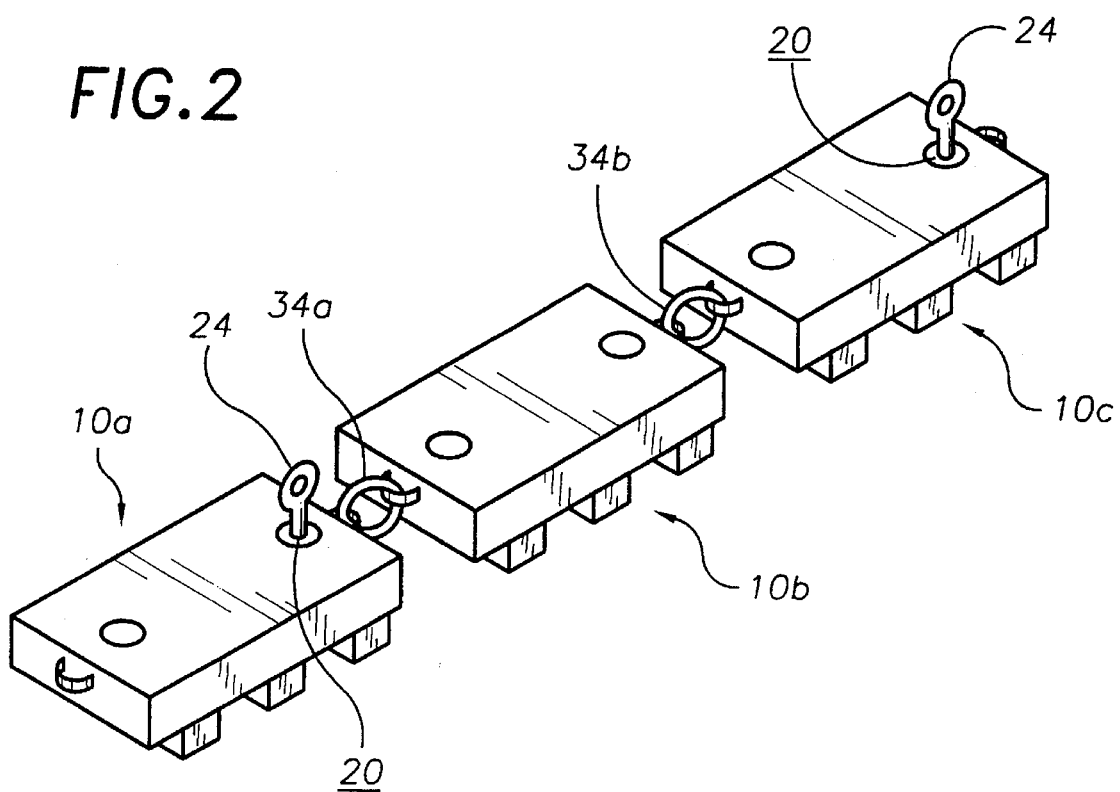
FIG. 2 is a perspective view of three of the exemplary combined feed decoy/anchor members of FIG. 1 linked from end to end.

FIG. 2 shows three combined feed decoy/anchor members 10a,10b,10c connected together end-to-end with a couple of lengths of nylon rope 34a,34b. Combined feed decoy/anchor members 10a,10c each have an eyebolt 24 threaded into a threaded eyebolt deceiving aperture 20.

Figure 3:
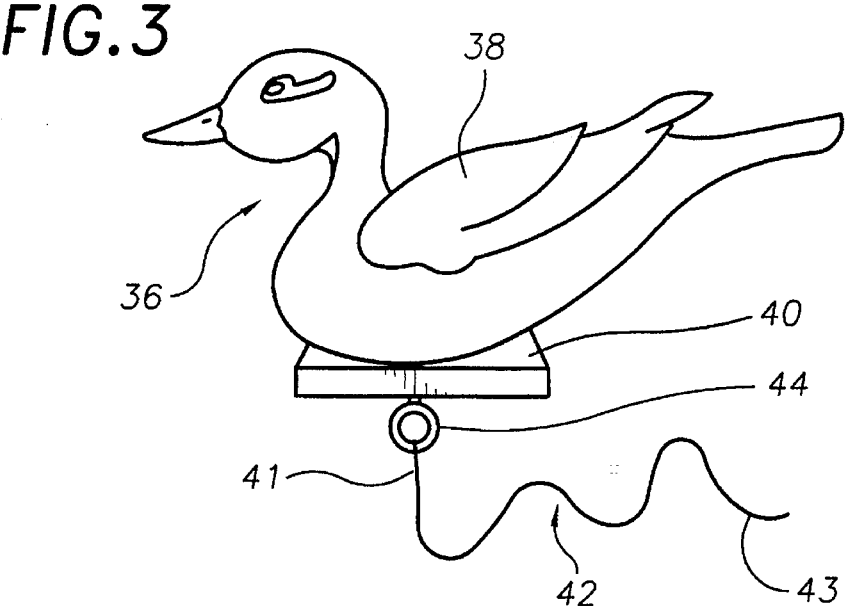
FIG. 3 is a side view of an exemplary full bird decoy showing the buoyant, full-bird shaped, second decoy portion, the second ballast portion secured beneath the second decoy portion and the second tether line.

FIG. 3 shows an exemplary swimming duck decoy member, generally designated by the numeral 36. Swimming duck decoy member 36 includes a buoyant, full-bird shaped, decoy portion 38 constructed from molded plastic. A metal, ballast portion 40 is secured beneath first decoy portion 38. Ballast portion 40 has a first end 41 of a length of nylon tether line 42 secured to a connecting loop 44 extending from the bottom of ballast portion 40. The second end 43 of tether line 42 is securable to one of eyebolts 24.

Figure 4:
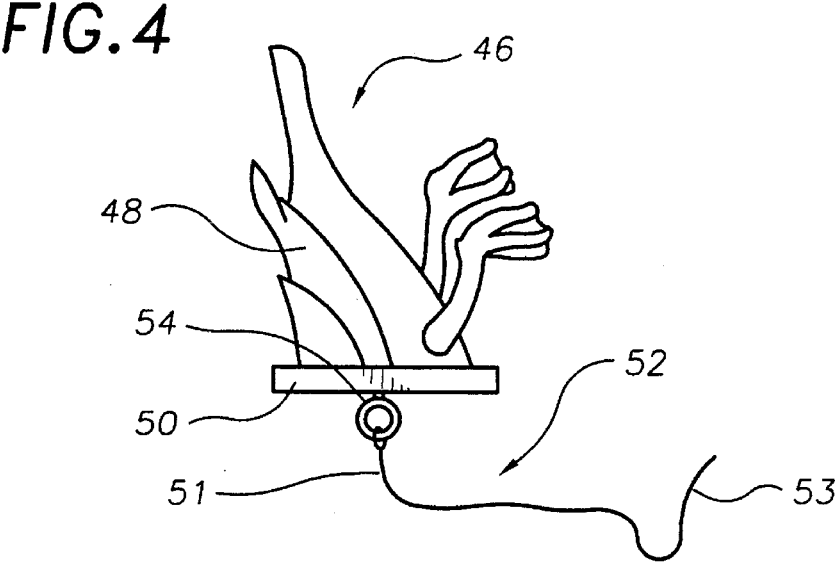
FIG. 4 is a side view of an exemplary feeding bird decoy showing the buoyant, feeding-bird shaped, first decoy portion, the first ballast portion secured beneath the decoy portion and the first tether line.

FIG. 4 shows an exemplary feeding duck decoy member, generally designated by the numeral 46. Feeding duck decoy member 46 includes a buoyant, feeding-bird shaped, decoy portion 48 constructed from molded plastic. A metal, ballast portion 50 is secured beneath second decoy portion 48. Ballast portion 50 has a first end 51 of a length of nylon tether line 52 secured to a connecting loop 54 extending from the bottom of ballast portion 50. The second end 53 of tether line 52 is securable to one of eyebolts 24.

Figure 5:
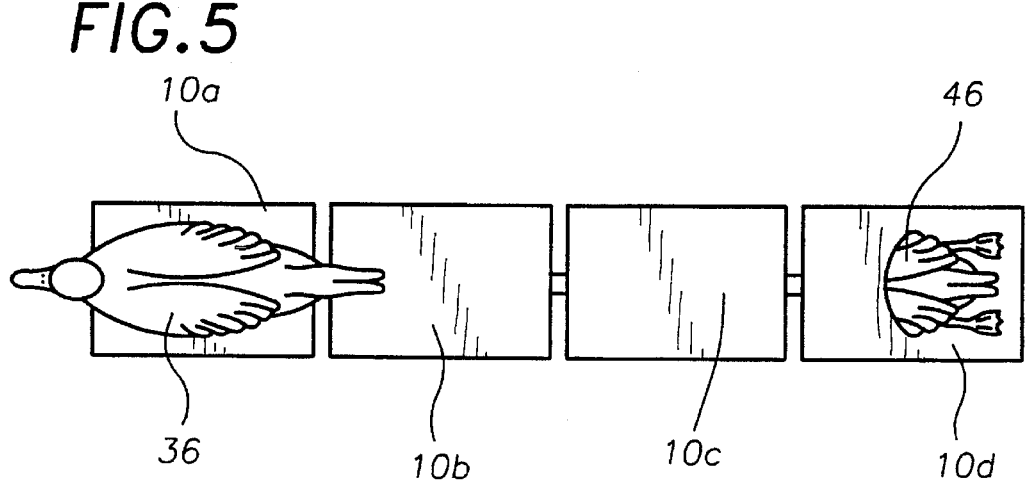
FIG. 5 is a top view of four of the exemplary combined feed decoy/anchor members of FIG. 1 linked from end to end with a full bird decoy secured to the eyebolt of one of the combined feed decoy/anchor members and a feeding bird decoy secured to the eyebolt of another of the combined feed decoy/anchor member.

FIG. 5 shows the exemplary embodiment of the waterfowl decoy system of the present invention, including four combined feed decoy/anchor members 10a–d, a full bird decoy member 36 and a feeding bird decoy member 46, as it appears from the air during use. Use of the waterfowl decoy system is now described with general reference to FIGS. 1–5. The decoy system is assembled for use by connecting two or more of the combined feed decoy/anchor members 10a–d from end-to-end to form a patch or area. A full bird decoy member 36 is then secured to one of the combined feed decoy/anchor members 10a–d by tieing the second end 43 of tether 42 to an eyebolt 24 secured to the combined feed decoy/anchor members 10a–d. A feeding bird decoy member 46 is then secured to combined feed decoy/anchor member 10d by tieing the second end 53 of tether 52 to an eyebolt 24 secured to the combined feed decoy/anchor members 10a–d. The patch or area created by connecting combined feed decoy/anchor members 10a–d from end-to-end is then positioned in the water bottom and the decoy members 38,48 allowed to float on the surface of the water body. With the waterfowl decoy system thus deployed flying waterfowl are given the impression that other waterfowl are eating and are drawn to the desired location.

It can be seen from the preceding description that a waterfowl decoy system has been provided that simulates waterfowl feeding activity; that provides a visual cue to flying waterfowl of the existence of food items beneath the surface of a body of water; and that utilizes an anchoring device as the visual cue.

It is noted that the embodiment of the waterfowl decoy system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A waterfowl decoy system comprising:

a plurality of combined feed decoy/anchor members each having an outer surface pigmented with a color that contrasts with a water bottom and having a weight-to-volume ratio sufficient to cause each of said plurality of combined feed decoy/anchor members to sink to said water bottom of a body of water, each of said plurality of combined feed decoy/anchor members having connecting rings extending from opposed side walls thereof in a manner to allow two or more of said plurality of combined feed decoy/anchor members to be linked end to end with a connecting mechanism, each of said plurality of combined feed decoy/anchor members having an upper surface thereof having at least one threaded eyebolt receiving aperture formed therein and a lower surface having a ballast receiving chamber member secured thereto, said ballast receiving chamber member having a sealable ballast cavity formed therein and filled with a ballast material;

a plurality of threaded eyebolts threaded to engage said eyebolt apertures, each eyebolt having an eye aperture therethrough through which a flexible tether is positionable;

a feeding duck decoy member having a buoyant feeding-bird shaped, first decoy portion, a first ballast portion secured beneath said first decoy portion and a first tether line securable to said eye aperture of one of said plurality of eyebolts; and a swimming duck decoy member including a buoyant, full-bird shaped, second decoy portion, a second ballast portion secured beneath said second decoy portion and second tether line securable to said eye aperture of one of said plurality of eyebolts.

2. The waterfowl decoy system of claim 1, wherein:

said combined feed decoy/anchor member is constructed from plastic having a pigment mixed therein to provide an outer surface having an appearance simulating a quantity of corn.

3. The waterfowl decoy system of claim 2, wherein:

said combined feed decoy/anchor member includes a pair of threaded eyebolt receiving apertures.

4. The waterfowl decoy system of claim 3 wherein:

said ballast receiving chamber member is constructed from a length of plastic tubing having a tube opening at one end thereof, and said ballast receiving chamber member further includes a cap portion securable within said tube opening in a manner to seal said length of plastic tubing.

5. The waterfowl decoy system of claim 4 wherein:

said cap portion is frictionally fit within said tube opening and removable and replaceable by a user.

6. The waterfowl decoy system of claim 2 wherein:

said ballast receiving chamber member is constructed from a length of plastic tubing having a tube opening at one end thereof, and said ballast receiving chamber member further includes a cap portion securable within said tube opening in a manner to seal said length of plastic tubing.

7. The waterfowl decoy system of claim 6 wherein:

said cap portion is frictionally fit within said tube opening and removable and replaceable by a user.

8. The waterfowl decoy system of claim 1, wherein:

said combined feed decoy/anchor member includes a pair of threaded eyebolt receiving apertures.

9. The waterfowl decoy system of claim 8 wherein:

said ballast receiving chamber member is constructed from a length of plastic tubing having a tube opening at one end thereof, and said ballast receiving chamber member further includes a cap portion securable within said tube opening in a manner to seal said length of plastic tubing.

10. The waterfowl decoy system of claim 9 wherein:
said cap portion is frictionally fit within said tube opening and removable and replaceable by a user.

11. The waterfowl decoy system of claim 1 wherein:
said ballast receiving chamber member is constructed from a length of plastic tubing having a tube opening at one end thereof, and said ballast receiving chamber member further includes a cap portion securable within said tube opening in a manner to seal said length of plastic tubing.

12. The waterfowl decoy system of claim 11 wherein:
said cap portion is frictionally fit within said tube opening and removable and replaceable by a user.

* * * * *